United States Patent
Stevens et al.

(10) Patent No.: US 9,262,050 B2
(45) Date of Patent: *Feb. 16, 2016

(54) SYSTEM AND METHOD FOR DISPLAYING FULL PRODUCT FUNCTIONALITY USING MINIMAL USER INTERFACE FOOTPRINT

(75) Inventors: Jeremy Max Stevens, Seattle, WA (US); Kanchan Mitra, Woodinville, WA (US); Ken Wickes, Seattle, WA (US); Kyle Krum, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

This patent is subject to a terminal disclaimer.

(21) Appl. No.: 12/862,704

(22) Filed: Aug. 24, 2010

(65) Prior Publication Data

US 2010/0318940 A1 Dec. 16, 2010

Related U.S. Application Data

(63) Continuation of application No. 11/041,521, filed on Jan. 21, 2005, now Pat. No. 7,797,645.

(51) Int. Cl.
  *G06F 3/048* (2006.01)
  *G06F 3/0482* (2013.01)
  *G06F 3/0481* (2013.01)

(52) U.S. Cl.
  CPC .......... *G06F 3/0482* (2013.01); *G06F 3/04817* (2013.01)

(58) Field of Classification Search
  CPC ........................... G06F 3/04817; G06F 3/0482
  USPC ......... 715/751–759, 765, 779, 810, 835, 838, 715/842
  See application file for complete search history.

(56) References Cited

U.S. PATENT DOCUMENTS

| | | | |
|---|---|---|---|
| 5,644,737 A * | 7/1997 | Tuniman et al. | 715/810 |
| 5,659,693 A | 8/1997 | Hansen et al. | |
| 5,745,110 A * | 4/1998 | Ertemalp | 715/764 |
| 5,745,712 A | 4/1998 | Turpin et al. | |
| 5,920,316 A | 7/1999 | Oran et al. | |
| 6,425,120 B1 * | 7/2002 | Morganelli et al. | 717/109 |
| 6,570,590 B1 * | 5/2003 | Dubrow et al. | 715/751 |
| 6,756,999 B2 | 6/2004 | Stoakley et al. | |
| 6,957,395 B1 | 10/2005 | Jobs et al. | |
| 7,010,755 B2 | 3/2006 | Anderson et al. | |
| 7,269,797 B1 * | 9/2007 | Bertocci et al. | 715/783 |

(Continued)

OTHER PUBLICATIONS

Smith et al., "GroupBar: The TaskBar Evolved", Proceedings of Australasian Computer Human Interaction Conference, Nov. 26-28, 2003, Queensland, Australia, pp. 34-43.*

(Continued)

*Primary Examiner* — Andrew Tank
(74) *Attorney, Agent, or Firm* — Tom Wong; Micky Minhas

(57) ABSTRACT

A sidebar UI of an application program provides access to the application program's functionality while occupying a reduced amount of real estate on the screen when compared to conventional UIs. The sidebar UI comprises an icon or multiple icons, and each icon references a pane that provides its user the ability to access and utilize a function and/or feature of the application program. Selecting an icon in the sidebar UI causes the referenced pane which provides access to, for example, a feature of the application program to be displayed on the screen. "Clicking off" the pane causes the pane to close.

18 Claims, 6 Drawing Sheets

(56) References Cited

U.S. PATENT DOCUMENTS

| | | | |
|---|---|---|---|
| 7,669,140 B2 * | 2/2010 | Matthews et al. | 715/779 |
| 7,734,690 B2 * | 6/2010 | Moromisato et al. | 709/204 |
| 7,797,645 B2 | 9/2010 | Stevens et al. | |
| 7,805,702 B2 * | 9/2010 | Jacovi et al. | 717/103 |
| 8,255,454 B2 * | 8/2012 | Broda | 709/203 |
| 2003/0105820 A1 | 6/2003 | Haims et al. | |
| 2003/0164862 A1 | 9/2003 | Cadiz et al. | |
| 2003/0179240 A1 * | 9/2003 | Gest | 345/779 |
| 2004/0212640 A1 | 10/2004 | Mann et al. | |
| 2005/0050462 A1 | 3/2005 | Whittle et al. | |
| 2005/0060664 A1 * | 3/2005 | Rogers | 715/810 |
| 2005/0132299 A1 | 6/2005 | Jones et al. | |
| 2005/0278654 A1 * | 12/2005 | Sims | 715/790 |
| 2006/0168538 A1 | 7/2006 | Stevens et al. | |

OTHER PUBLICATIONS

Glenn, Walter, "How to Use Microsoft Windows XP,"© 2002 by Sams Publishing, pertinent pp. 13, 16, 17 and 208.

* cited by examiner

SYSTEM AND METHOD FOR DISPLAYING FULL PRODUCT FUNCTIONALITY USING MINIMAL USER INTERFACE FOOTPRINT

The present application is a Continuation Application of U.S. patent application Ser. No. 11/041,521, filed Jan. 21, 2005, now U.S. Pat. No. 7,797,645 issued Sep. 14, 2010, and entitled "SYSTEM AND METHOD FOR DISPLAYING FULL PRODUCT FUNCTIONALITY USING MINIMAL USER INTERFACE FOOTPRINT," which is incorporated herein in its entirety by reference.

TECHNICAL FIELD

The described technology is directed generally to application program user interfaces and, more particularly, to displaying an application program's functionality in a minimal user interface footprint.

BACKGROUND

Today's global economy demands effective worldwide communication. For example, manufacturers often have suppliers located across the country and around the world. Timely and effective communication between the manufacturer and supplier can be critical to business success. In other cases, companies often assign business projects to work groups with members physically located around the world. In some situations, the work group members can belong to different organizations and/or companies. As with manufacturers and suppliers, timely and effective communication can be critical to the success of the work group.

Face-to-face meetings have been the traditional method of communicating, but, with the organizations becoming increasing geographically dispersed, these meetings often require travel on the part of attendees and, thus, are becoming increasingly time and cost prohibitive. With proliferation of computers and the advent of the Internet, and in particular, the maturing of the World Wide Web ("web"), these meetings are increasingly taking place virtually over computer networks through the use of electronic communication technologies, such as web meeting/conferencing and application sharing.

Application sharing technologies enable a sharing user, also referred to as a "presenter," to share an application with various viewing users, also referred to as "attendees" or "participants." The display produced by the application that is executing on the presenter's computer, and which is being shared, is made available via a connection, typically through a computer network, to the attendees' computers.

For example, when application sharing, the presenter of the application sharing session sends images of an area on the presenter's computer screen—i.e., the desktop—to all the other attendees in the meeting. The presenter may be able to designate what is to be shared with the attendees by, for example, electing to share the contents displayed on the entire screen, the contents displayed within a "sharing frame," which is a portion of the screen designated by the presenter using a pointing device such as a mouse, or the contents displayed by an application, typically in an application window. The attendees of the meeting see the shared images reconstructed on their own computers, and are able to see exactly what the presenter is seeing.

When application sharing, the focus of the presenter should be on the application or desktop that is being shared, and not on the online meeting service console. In order to direct the focus to the application or desktop that is being shared, as much screen real estate as possible should be made available—i.e., given over—to the application being shared.

A primary hindrance to allowing the presenter to focus on the application or desktop that is being shared is the UI created by the online meeting service. Conventional online meeting service UIs clutter the presenter's desktop with many application panes. While these panes provide access to online meeting functions, such as, by way of example, instant messaging, attendee roster, meeting status, etc., these panes use up a large portion of the screen real estate, which effectively reduces the screen real estate that is available for use by the application being shared. One solution is for the presenter to "collapse" these panes, but then, the presenter will not have full functionality of the online meeting service console and, moreover, may not know what is occurring in or with the online meeting.

It would be desirable to have a user interface that occupies a reduced amount of real estate on the screen, yet still provides access to the online meeting service functionality in order to enhance the presenter's sharing experience.

DETAILED DESCRIPTION

Figure 1:
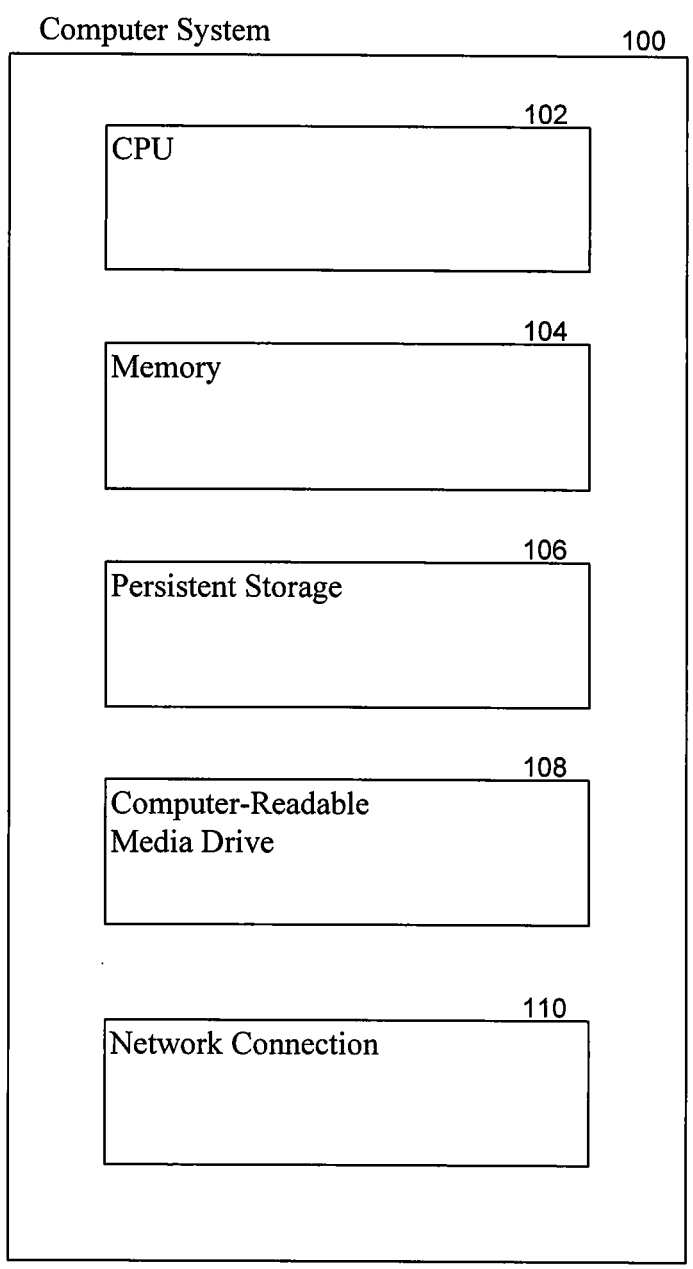
FIG. 1 is a block diagram illustrating selected components typically incorporated in at least some of the computer systems on which various embodiments of a sidebar UI may be implemented.

A method and system for displaying full product functionality using minimal UI footprint is provided. Application programs, such as MICROSOFT LIVE MEETING, VISUAL STUDIO, OUTLOOK, and MEDIA PLAYER, provide some of their functionality through a user interface (UI) which displays multiple panes and/or regions on a computer screen. While providing a user access to the functionality of an application program, the displayed panes and/or regions consume real estate on the screen, thus leaving less available screen real estate for other uses.

In one embodiment, an application program's UI panes and regions are relocated into a sidebar UI. A sidebar UI is a UI with a reduced screen real estate footprint. The sidebar UI comprises an icon or multiple icons, and each icon references a pane that provides its user the ability to access and utilize a function and/or feature—i.e., functionality—of the application program. As such, an icon in the sidebar UI serves as an entry point to the functionality of the application. For example, one icon may serve as an entry point to a chat room function provided by the application. Selecting the icon, using a pointing device, causes a pane which provides access to the chat room functionality, to be displayed on the screen. "Clicking off" the pane causes the pane to close—i.e., no longer be displayed on the screen. In this manner, the sidebar UI operates as a "container" for the application program's conventional—i.e., regular or expanded—UI. Moreover, the sidebar UI occupies a reduced amount of real estate on the screen, while still providing access to the application's functionality though panes or windows that "fly out" from the sidebar UI.

In some embodiments, a "trigger" is provided in an application's conventional UI which activates the sidebar UI. The trigger may also be provided in the sidebar UI. The trigger allows its user to toggle back-and-forth between the application's conventional UI—i.e., the UI having the displayed panes and regions—and the sidebar UI. In other embodiments, the sidebar UI provides a compact view of the application, itself. For example, the icons displayed in the sidebar UI may change, for example, its shape, color, etc., to provide its viewer an indication of the application's status. In still other embodiments, an animation is displayed when the panes and regions in the application's conventional UI collapse into the sidebar UI. Here, the animation, such as a window scrolling across the screen and fading into the sidebar, can serve as an indication to its viewer that the panes in the conventional UI are being collapsed into the sidebar UI, and vice versa. Stated another way, the animation serves as an indication to its viewer that the conventional UI is transitioning to the sidebar UI, and vice versa.

The various embodiments of the UI sidebar and its advantages are best understood by referring to FIGS. 1-6 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a block diagram illustrating selected components typically incorporated in at least some of the computer systems on which various embodiments of the sidebar UI may be implemented. These computer systems 100 may include one or more central processing units ("CPUs") 102 for executing computer programs; a computer memory 104 for storing programs and data—including data structures—while they are being used; a persistent storage device 106, such as a hard drive, for persistently storing programs and data; a computer-readable media drive 108, such as a CD-ROM drive, for reading programs and data stored on a computer-readable medium; and a network connection 110 for connecting the computer system to other computer systems, such as via the Internet, to exchange programs and/or data—including data structures. It will be appreciated that computer systems 100 may include one or more display devices for displaying program output, such as video monitors or LCD panels, and one or more input devices for receiving user input, such as keyboards, microphones, or pointing devices such as a mouse.

Embodiments of the sidebar UI may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The invention may be described in the general context of computer-readable instructions, such as program modules, executed by computer systems 100 or other devices. Generally, program modules include routines, programs, objects, components, data structures, etc. that perform particular tasks or implement particular abstract data types. Memory 104 and persistent storage device 106 are computer-readable media that may contain instructions that implement the facility. It will be appreciated that memory 104 and persistent storage 106 may have various other contents in addition to the instructions that implement the screen sharing indication system.

In the discussion that follows, embodiments of the sidebar UI are described in conjunction with a collaboration application. It will be appreciated that the embodiments of the sidebar UI may be used in circumstances that diverge significantly from these examples in various respects.

For example, even though various embodiments of the sidebar UI are described in conjunction with a collaboration service program, the sidebar UI techniques are not to be limited to only collaboration applications. As such, one skilled in the art will appreciate that the described techniques can be adapted to work as a component of or in conjunction with various other applications which have UIs that display multiple panes and/or regions on a computer screen.

Figure 2:
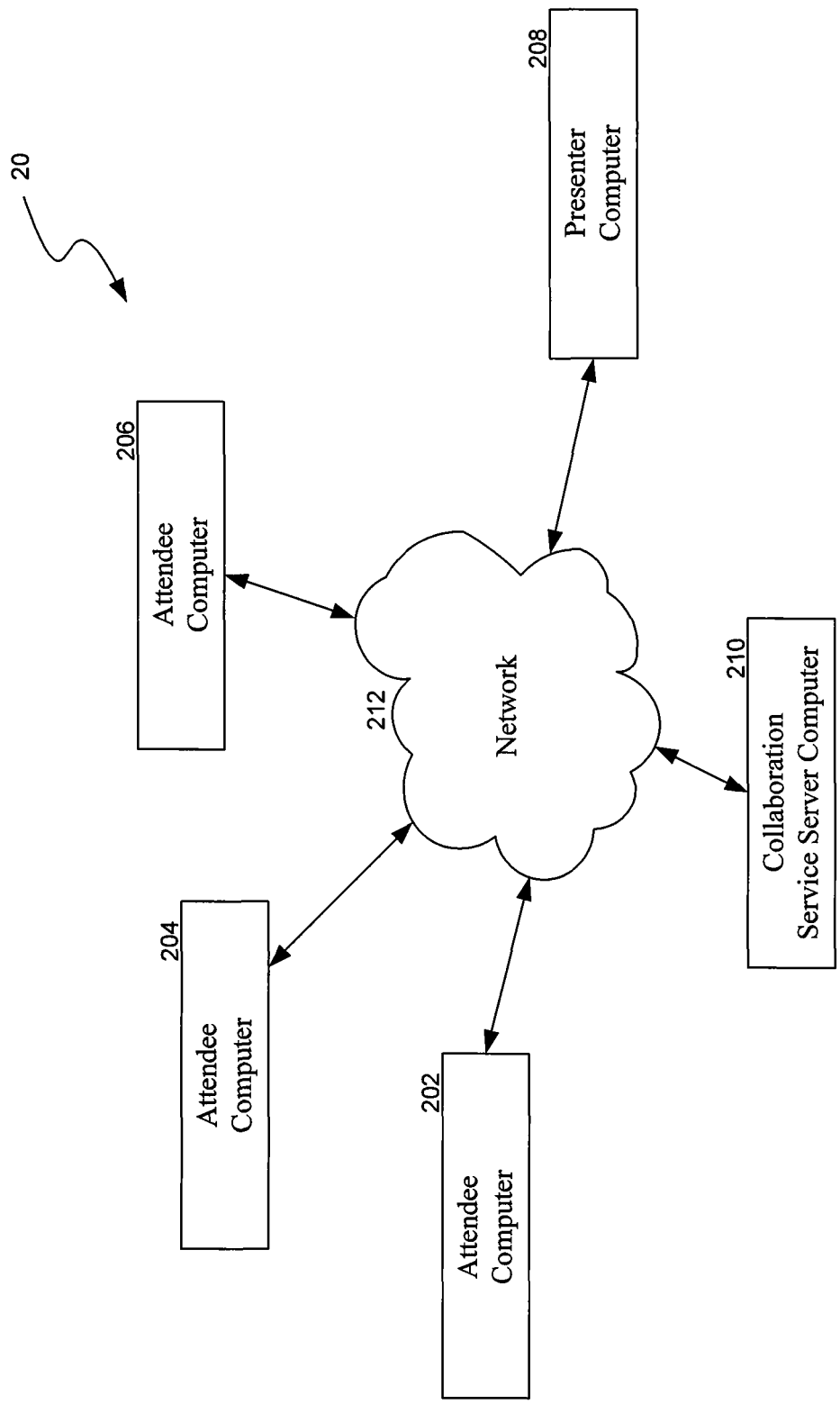
FIG. 2 is a high-level block diagram showing an environment in which an application having a sidebar UI may operate.

FIG. 2 is a high-level block diagram showing an environment in which an application having a sidebar UI may operate. As depicted, environment 20 comprises one or more attendee computers illustrated, by way of example, as computers 202, 204, and 206, a presenter computer 208, and a collaboration service server computer 210. In particular, computers 202, 204, 206, 208, and 210 are each coupled to one another through a network 212. As used herein, the terms "connected," "coupled," or any variant thereof, means any connection or coupling, either direct or indirect, between two or more elements; the coupling of connection between the elements can be physical, logical, or a combination thereof.

Computers 202, 204, 206, 208, and 210 are as discussed above more generally with respect to FIG. 1. In particular, the attendee computer is used by a user to attend or participate in a collaboration session, the presenter computer is used by a user to host or present the collaboration session, and the collaboration service server computer provides the collaboration service, such as MICROSOFT LIVE MEETING, by "hosting" the collaboration session.

Network 212 is a communications link that facilitates the transfer of electronic content between, for example, the attached computers. In one embodiment, network 206 includes the Internet. It will be appreciated that network 212 may be comprised of one or more other types of networks, such as a local area network, a wide area network, a point-to-point dial-up connection, and the like.

Figure 3:
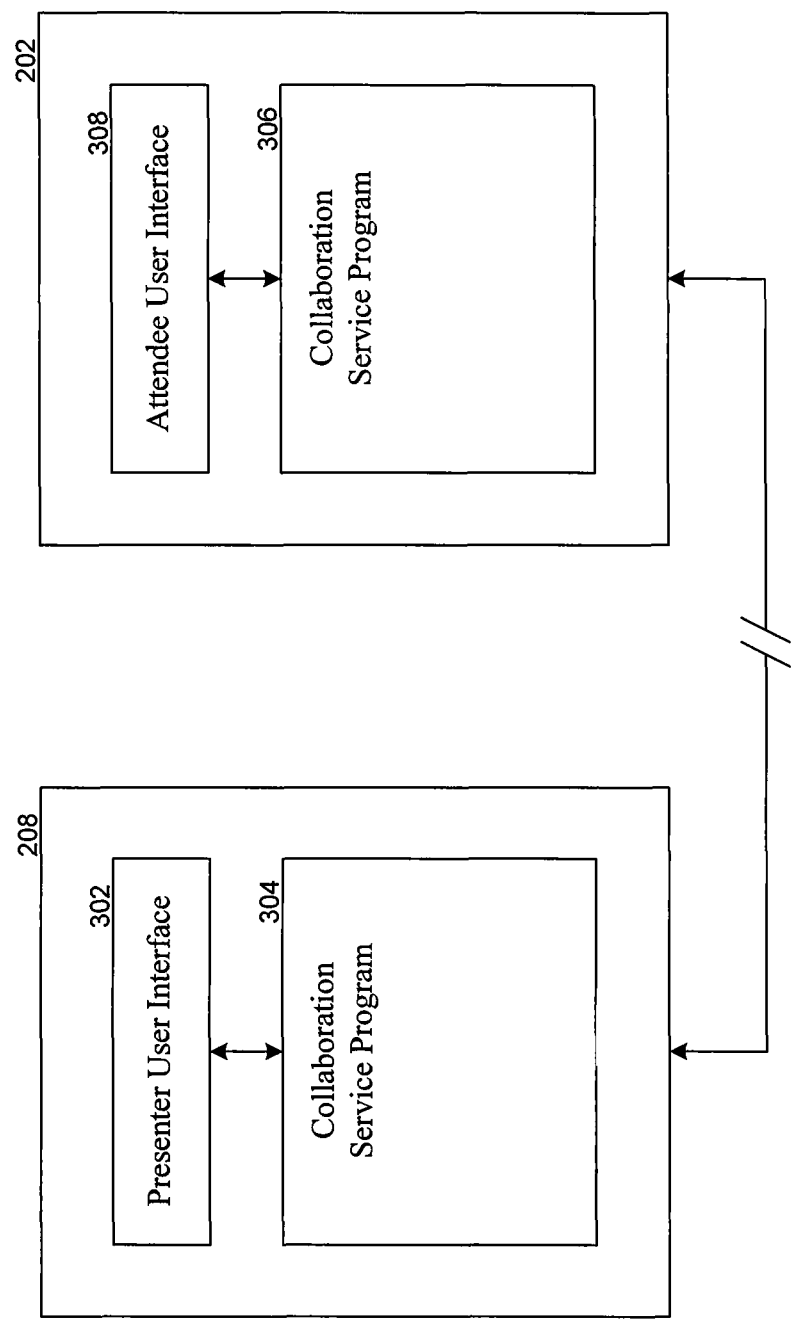
FIG. 3 is a block diagram illustrating selected components of a presenter computer coupled to an attendee computer, according to some embodiments.

FIG. 3 is a block diagram illustrating selected components of presenter computer 208 coupled to attendee computer 202, according to some embodiments. One skilled in the art will appreciate that although only one attendee computer is illustrated in FIG. 3, this is not meant as a limitation to the actual number of attendee computers and that there can be more than one attendee computer in an implementation of the system, as illustrated by way of FIG. 2. Even though the presenter computer is illustrated as being coupled to the attendee computer, one skilled in the art will appreciate that the presenter and attendee computers may communicate with one another through the collaboration service server computer, as illustrated in FIG. 2. Alternatively, in embodiments where the collaboration service server computer is not present, the presenter and attendee computers may communicate directly with one another. In these embodiments, the collaboration service may be provided by the presenter computer.

As depicted, the presenter computer comprises a presenter user interface 302 and a collaboration service program 304. The attendee computer comprises a collaboration service program 306 and an attendee user interface 308. The aforementioned components and processes of the presenter computer and the attendee computer are only illustrative, and one skilled in the art will appreciate that the computers may include other components and process not depicted.

The presenter user interface on the presenter computer functions as an interface through which a user—i.e., a presenter—may conduct a collaboration session using an instance of the collaboration service program. In one embodiment, the presenter user interface comprises a conventional UI—i.e., a UI that has most or all of the panes and regions associated with the collaboration program displayed—and a sidebar UI, and provides a trigger that allows the user to toggle back-and-forth between the various UIs.

The collaboration service program allows the presenter to register with the collaboration service and to conduct the collaboration session. The collaboration service program seamlessly connects people and information in real time, allowing people to work together on for example, documents, projects, and tasks. The collaboration service program on the presenter computer is coupled to a counterpart collaboration service program executing on the attendee computer. The counterpart collaboration service program allows the attendee to register with the collaboration service and to participate in the collaboration session. The attendee user interface functions as an interface through which a user—i.e., an attendee—may participate in a collaboration session using an instance of the collaboration service program. In one embodiment, the attendee user interface may provide a conventional UI and a sidebar UI, and a trigger that allows the user to toggle back-and-forth between the two UIs.

Figure 4:
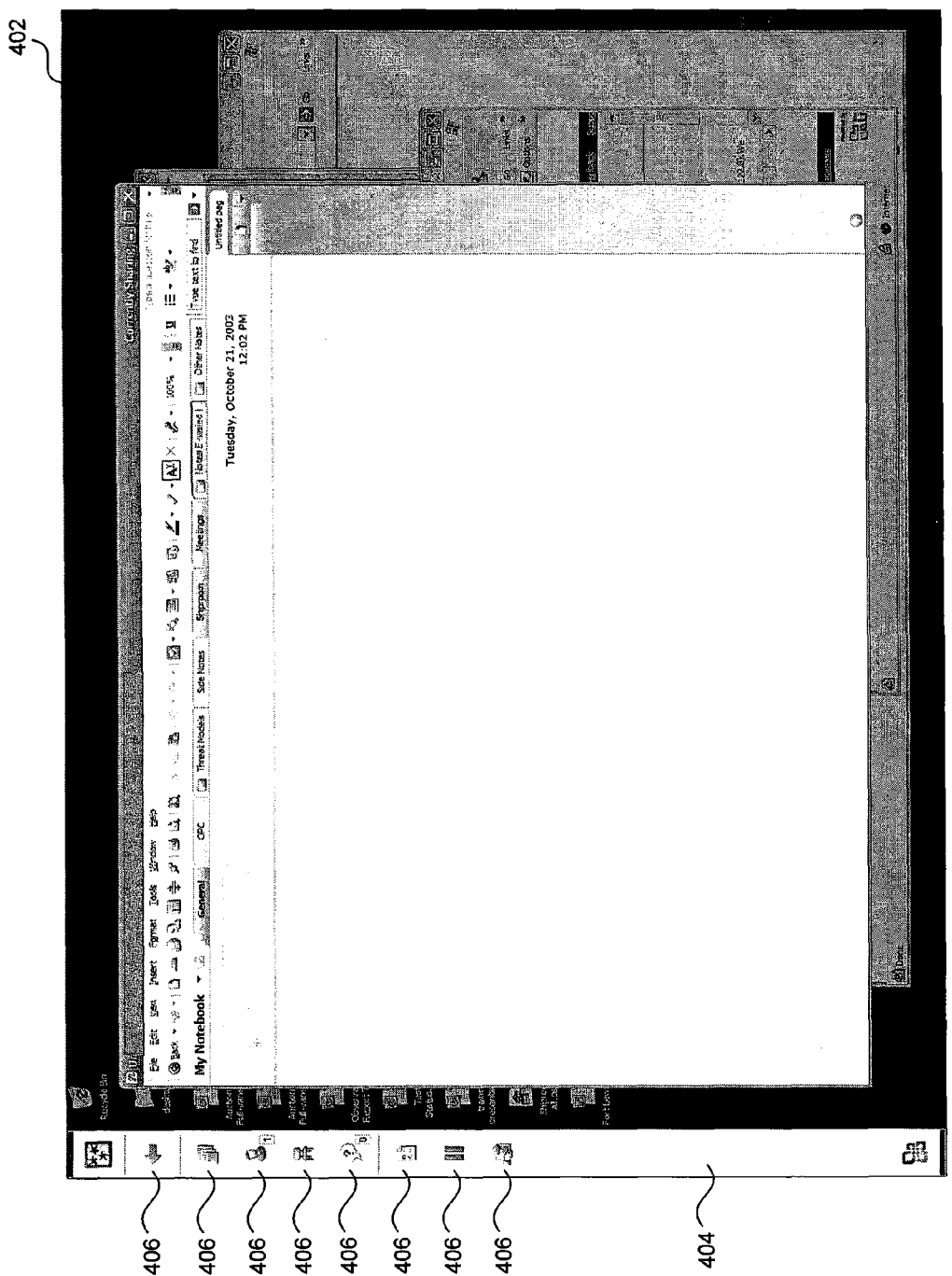
FIG. 4 is a display diagram illustrating a sample desktop displaying a sidebar UI on a presenter computer, according to one embodiment.

FIG. 4 is a display diagram illustrating a sample desktop 402 displaying a sidebar UI 404 on a presenter computer, according to one embodiment. The sidebar UI functions as a console—i.e., an interface—through which the presenter or other user can conduct the collaboration session. As depicted, the sidebar UI comprises a plurality of icons 406. The icons in the sidebar UI enable the sidebar UI to provide a compact view of a single application program, such as the collaboration service program or other application program.

Each icon may represent and provide access to a function or feature of the collaboration service program. Stated another way, each icon functions as an entry point to a function or feature of the application program. For example, one icon may represent and provide access to a question-and-answer feature of the collaboration service program. Other icons may represent and provide access to additional functions and features such as attendees from where the presenter can start a chat, seating chart of the attendees, whiteboards, document annotation, application sharing, slide presentations, and other collaboration functions and features.

In some embodiments, one or more of the icons may be dynamic in that they provide its viewer—i.e., presenter—status information regarding the function or feature associated with the dynamic icon. For example, an icon for a seating chart may change colors to show or indicate feedback from attendees to "slow down" or "speed up." Further, the intensity of the color or the varying colors may indicate feedback from a single attendee or a varying number of attendees. In another example, an icon for a question-and-answer feature may indicate the number of questions that are currently pending. In other embodiments, an icon may function as a control through which the presenter or other user can control or operate a feature of the collaboration service program or modify the state of a collaboration session. For example, the presenter may select an icon shaped as a backwards arrow to return to the main console.

Figure 5:
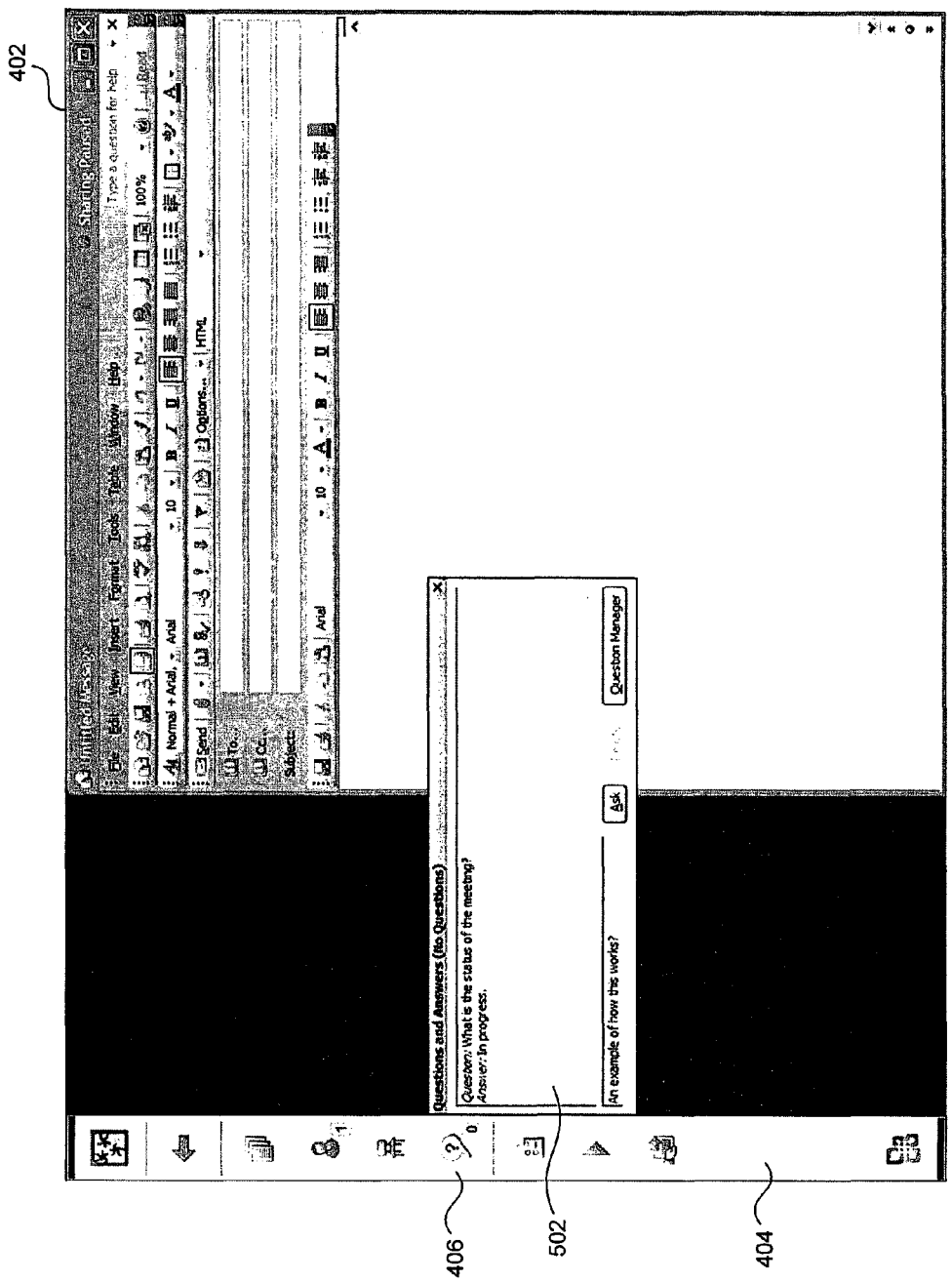
FIG. 5 is a display diagram illustrating a sidebar UI displaying a pane, according to one embodiment.

FIG. 5 is a display diagram illustrating a sidebar UI displaying a pane 502, according to one embodiment. In particular, the displayed pane is a "Question & Answer" pane, which appears on the screen when its associated icon—i.e., the Question & Answer icon—in the sidebar UI is selected. For example, a presenter or other user can select the Question & Answer icon causing the Question & Answer pane to be displayed. The presenter can then access the Question & Answer feature to, for example, answer a question posed by one of the attendees, or pose a question to an attendee or multiple attendees. When the presenter is finished using the Question & Answer feature, the presenter can click off the Question & Answer pane to close the pane. In like manner, the presenter can access the other functions or features by selecting the appropriate icon in the sidebar UI.

Figure 6:
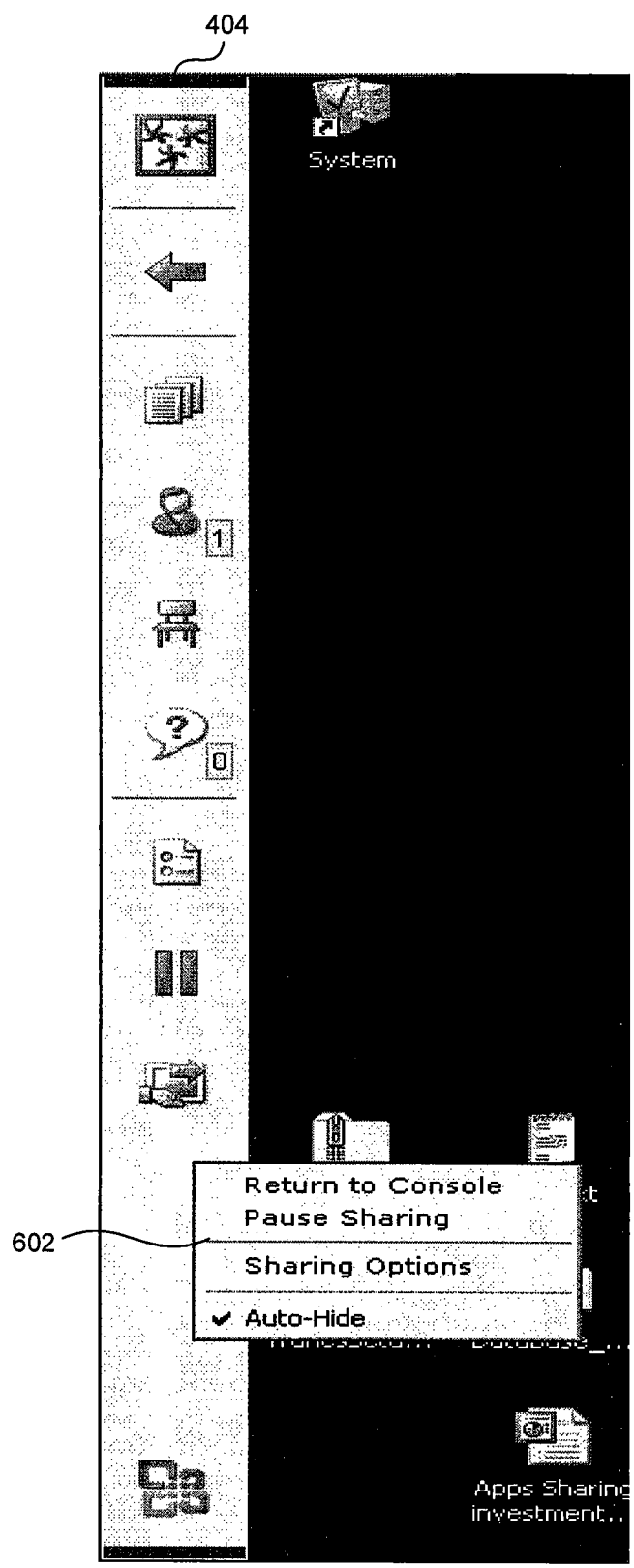
FIG. 6 is a display diagram illustrating an auto-hide option for a sidebar UI, according to one embodiment.

In one embodiment, the sidebar UI may be hidden and unhidden. For example, an auto-hide option may be provided for hiding and unhiding the sidebar UI. This option may be made available to the presenter in a right click menu or a dialog. FIG. 6 is a display diagram illustrating an auto-hide option for a sidebar UI, according to one embodiment. For example, right clicking anywhere on the sidebar UI that's not already an icon displays a menu 602. As depicted, the menu comprises a "Return to Console" option, a "Pause Sharing" option, a "Sharing Options" option, and an "Auto-Hide" option. Even though application sharing options are shown displayed in the menu, one skilled in the art will appreciate that the menu may comprise other options in addition to or instead of the application sharing options. For example, if application sharing is not being performed in the collaboration session, the application sharing options may not be displayed in the menu, and the menu may display other options associated with the collaboration feature currently being used during the collaboration session.

The Return to Console option may end a current collaboration feature, such as application sharing, and return to the collaboration service console. The Pause Sharing option pauses sharing if it is not already paused. When paused, a checkmark may appear to the left of this entry in the menu. When selecting this entry while paused, it clears the checkmark and start sharing again. The Sharing Options option launches an application sharing options dialog. The auto-hide option causes the sidebar UI to auto-hide, for example, to the left. When selected, a checkmark may appear to the left of the entry, and the sidebar UI hides to the left. When the sidebar UI is hidden, an icon may be presented on the desktop that enables the presenter to unhide the sidebar UI.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer system for providing a sidebar user interface of an application program having panes, the computer system comprising:
    a memory storing computer-executable instructions that when executed by the computer system:
        provide a conventional user interface of the application program, the conventional user interface for simultaneously displaying on a screen of the computer system content of the application program and multiple panes within a window of the application program, each pane providing access to a different set of functions provided by the application program and being displayed separately from the content so as to reduce screen real estate available for displaying the content of the application program;

provide the sidebar user interface of the application program, the sidebar user interface of the application program for:

simultaneously displaying on the screen the content of the application program and a sidebar with icons, each icon associated with a pane of the application program, in response to receiving a selection of a first icon of the sidebar, displaying on the screen a first pane of the application program so that a user can access the set of functions of the first pane, the first pane being displayed simultaneously with the content of the application program, and in response to receiving a selection to close the first pane of the application program, removing from the screen the display of the first pane of the application program; and trigger the providing of the sidebar user interface instead of the conventional user interface.

2. The computer system of claim 1 wherein the application program is a collaboration application program.

3. The computer system of claim 1, wherein the component is further configured to dynamically modify at least one icon of the sidebar based at least in part on feedback received from at least one user of the application program.

4. The computer system of claim 1 wherein the component is further configured to provide the first pane adjacent to the sidebar.

5. The computer system of claim 1 wherein the component is further configured to animate the first pane so that it appears to fly out from the sidebar.

6. The computer system of claim 1 wherein the application program is a personal information manager application program.

7. The computer system of claim 1 wherein the application program is a media player application program.

8. A method performed by a computer having a memory and a processor, the method comprising:

displaying a conventional user interface of the application program, the conventional user interface displaying content of the application program and multiple panes that each pane provide access to a different set of functions implemented by the application program;

in response to a user selecting a sidebar user interface of the application program, displaying the content of the application program and a sidebar of the sidebar user interface, collapsing the displayed multiple panes of the application program into the sidebar of the sidebar user interface, and displaying a plurality of icons for display within the sidebar, each of the panes of the application program being associated with an icon within the sidebar; and in response to a user selecting an icon within the sidebar, displaying a first pane of the application program associated with the selected icon wherein the first pane provides access to a first set of functions implemented by the application program, wherein the first pane is displayed simultaneously with content of the application program that is already displayed.

9. The method of claim 8, further comprising:

in response to a user selecting to close the first pane of the application program, causing the first pane of the application program to be removed.

10. The method of claim 8 wherein collapsing the displayed panes into the sidebar includes an animation indicating a transition to the sidebar user interface.

11. The method of claim 8, further comprising:

modifying at least one icon of the sidebar based at least in part on the status of the application program.

12. The method of claim 8, further comprising:

modifying at least one icon of the sidebar based at least in part on feedback received from at least one user of the application program.

13. A computer-readable memory that is not a propagating signal containing instructions for performing a method, the method comprising:

displaying a conventional user interface of a first application program, the conventional user interface for simultaneously displaying on a screen of a computer system content of the first application program and multiple first panes within a window of the first application program, each first pane providing access to a different feature provided by the first application program;

receiving an indication to toggle from the conventional user interface to a first sidebar user interface in response to receiving the indication, displaying the first sidebar user interface of the first application program within the window of the first application program in place of the conventional user interface, the displayed first sidebar user interface including content of the first application program and a first sidebar with multiple first icons, each first being associated with a first pane of the first application program; and displaying a first pane of the first application program associated with a first icon in response to the first icon of the first sidebar being selected so that access is provided to a feature implemented by the first application program.

14. The computer-readable memory of claim 13, the method further comprising:

modifying at least one first icon of the first sidebar based at least in part on the status of the first application program; and modifying at least one first icon of the sidebar based at least in part on feedback received from at least one user of the first application program.

15. The computer-readable memory of claim 13 wherein one or more of the first icons provides a compact view of the first pane of the first application program associated with that first icon.

16. The computer-readable memory of claim 13 wherein one or more of the first icons are dynamic icons that each display status information related to a function associated with the dynamic icon.

17. The computer-readable memory of claim 13, the method further comprising:

providing a second sidebar user interface of a second application program, wherein the second sidebar user interface of the second application program includes a second sidebar with multiple second icons, wherein each second icon is associated with a second pane of the second application program, wherein each second pane provides access to a feature of the second application program so that each second icon of the second sidebar is associated with a feature of the second application program.

18. The computer-readable memory of claim 17, wherein the first application program is a collaboration application program so that the first sidebar user interface is provided by the collaboration application program and wherein the second application program is a development environment application program so that the second sidebar user interface is provided by the development environment application program so that the first sidebar user interface and the second sidebar user interface are each provided by different application programs.

* * * * *